(12) United States Patent
Alrasheed et al.

(10) Patent No.: US 11,295,117 B2
(45) Date of Patent: Apr. 5, 2022

(54) FACIAL MODELLING AND MATCHING SYSTEMS AND METHODS

(71) Applicant: Sultan A. Alrasheed, Jeddah (SA)

(72) Inventors: Sultan A. Alrasheed, Jeddah (SA); Yasir Osama Atabani, Khartoum (SD)

(73) Assignee: Sultan A. Alrasheed, Jeddah (SA)

( * ) Notice: Subject to any disclaimer, the term of this patent is extended or adjusted under 35 U.S.C. 154(b) by 32 days.

(21) Appl. No.: 16/521,519

(22) Filed: Jul. 24, 2019

(65) Prior Publication Data

US 2020/0034604 A1 Jan. 30, 2020

Related U.S. Application Data

(60) Provisional application No. 62/702,431, filed on Jul. 24, 2018.

(51) Int. Cl.
*G06K 9/00* (2006.01)
*G06K 9/62* (2022.01)

(52) U.S. Cl.
CPC ..... *G06K 9/00288* (2013.01); *G06K 9/00308* (2013.01); *G06K 9/6263* (2013.01); *G06K 2009/00322* (2013.01)

(58) Field of Classification Search
CPC ............ G06K 9/00288; G06K 9/6263; G06K 9/00308; G06K 2009/00322; G06K 9/00208
See application file for complete search history.

(56) References Cited

U.S. PATENT DOCUMENTS

| | | | |
|---|---|---|---|
| 9,235,782 B1 | 1/2016 | Zomet et al. | |
| 9,342,855 B1 | 5/2016 | Bloom | |
| 9,542,419 B1 | 1/2017 | Vanhoucke et al. | |
| 2008/0052312 A1* | 2/2008 | Tang | G06F 16/583 |
| 2009/0185723 A1* | 7/2009 | Kurtz | G06K 9/00926 382/118 |
| 2011/0038512 A1* | 2/2011 | Petrou | G06F 16/532 382/118 |
| 2012/0134545 A1* | 5/2012 | Lai | H04M 1/27475 382/115 |
| 2015/0156157 A1* | 6/2015 | Zhang | H04L 51/04 709/206 |
| 2018/0188911 A1* | 7/2018 | Wang | G06F 3/0482 |

\* cited by examiner

*Primary Examiner* — Qian Yang
(74) *Attorney, Agent, or Firm* — McCoy Russell LLP

(57) ABSTRACT

A matching apparatus for characterising the human face in order to facilitate the search for people with similar faces. The apparatus uses 3D modelling of a variety of image sources including video to characterise a subject's face using a set of parameters. These parameters are then used to identify other people or image sources which have a set of parameters which are similar to the subject's. Feedback from the users is used to improve future matching.

16 Claims, 4 Drawing Sheets

FACIAL MODELLING AND MATCHING SYSTEMS AND METHODS

CROSS-REFERENCE TO RELATED APPLICATIONS

The present application claims priority to U.S. Provisional Application No. 62/702,431, entitled "FACIAL MODELLING AND MATCHING SYSTEMS AND METHODS", and filed on Jul. 24, 2018. The entire contents of the above-listed application are hereby incorporated by reference for all purposes.

TECHNICAL FIELD

The invention relates to facial modelling. In particular, the invention relates to finding matches between images of people based on facial similarity.

BACKGROUND AND SUMMARY

Similar looking people often share common interests and get along well. This effect has been recognized and has been used to allow people to search for others with similar facial characteristics.

U.S. Pat. No. 9,542,419 B1 discloses a similarity search which may be performed on the image of a person, using visual characteristics and information that is known about the person. The search identifies images of other persons that are similar in appearance to the person in the image.

U.S. Pat. No. 9,342,855 B1 relates to a system having a dating website using facial images technology to match a first user to a second user having similar facial features and electronically introducing the users for establishing a dating relationship. The website further selects matches to the first user among the matches bearing a facial resemblance to the user based on complementary styles, values and compatible personalities. The website is accessed directly, through social networking sites or through mobile applications on smartphones and other handheld computing devices. The mobile application notifies the website where the user is and informs the user if any matching users are nearby or in the same location. If no matches are available in the location, the user photographs new acquaintances using the handheld computing device and uploads the photos to determine if the new acquaintants bear a facial resemblance to the user.

U.S. Pat. No. 9,235,782 discloses a system and method for searching images and identifying images with similar facial features. In one implementation, the system includes a pre-processing module, a feature extraction module, a model creation module, a similarity identifier module and a results display module. The pre-processing module receives a facial image, determines key-points associated with a facial feature and identifies a facial area including the facial feature. The feature extraction module extracts the key-points. The model creation module creates a similarity model for determining similar facial features at least in part by comparing the facial feature from a plurality of images. The similarity identifier module applies a similarity model to compare facial features in different images in order to determine images and people which are similar. The results display module presents a result based at least in part on the determination.

In accordance with the present disclosure, there is provided a matching apparatus comprising a processor and memory, the processor and memory configured to:

receive multiple subject image sources of a subject person including at least one video;

processing the subject image sources using 3D facial modelling to determine a set of facial characteristics of the subject person;

perform a similarity search for images of faces which are similar to the subject's face based on the determined set of facial characteristics;

in response to the similarity search, identifying a plurality of matching image sources of one or more persons that are similar in appearance to the subject;

providing search results based on the subset of the plurality of matching image sources.

Using video may be advantageous because it may help understand how the subject moves, and how their expressions change with time. This may allow the system to better determine the subject's underlying facial structure by taking into account the subject's changing facial expression and degree of mobility in the subject's face. Just using photographs may prevent motion being taken into account and may result in the user's face being characterised based on a particular camera pose. For example, if the subject uses the same smile for a series of photos, the system may erroneously interpret this pose as representing the subject's resting face.

The apparatus may be configured to:

determine an overall similarity score based on the degree of similarity of each of the determined set of facial characteristics, wherein the contribution to the overall similarity score for each facial characteristic is weighted by a weighting value associated with the relative importance of the associated facial characteristic in determining the overall similarity score; and adjust the weighting values based on user input.

Although it is known that facial similarities may lead to more meaningful relationships, it is not clear which facial features are most important for determining which people would be the best match. Therefore, by incorporating feedback from the user, the matching algorithm may be able to identify better matches.

The user input may comprise one or more of:

the subject requesting a digital connection with at least one of the identified matches; and establishing a digital connection between the subject and at least one of the identified matches.

Establishing a digital connection may be contingent on the identified match accepting a request for digital connection. A digital connection between two people may allow the two people to communicate directly using the platform (e.g. text messages, audio calls) and/or allow one person to see content generated by the other person (e.g. posts with text and/or images).

The user input may comprise one or more of:

the number of digital interactions between the subject and one at least one of the identified matches after a digital connection (e.g. which allows the connected users to establish an ongoing digital relationship via, for example, exchanging texts, images or video messages) has been established; and the duration of digital interaction between the subject and one at least one of the identified matches after a digital connection has been established.

A digital interaction between two people may comprise one or more of the following: one person interacting with a digital post of the second person (e.g. commenting on a public post, liking a post), sending a message, sending an email, sending a photo, and making a real time audio or audiovisual call.

These user inputs allow the system to learn what the best matches are, based on passively observing the behaviour of the users. In this way, the user is not asked to carry out additional quality control tasks (e.g. such as completing questionnaires) which may be less accurate and more onerous for the user.

The apparatus may be configured to:
determine the date of capture of each of the multiple image sources; and
determine how the subject is aging based on differences in the subject's face between the multiple image sources with different ages; and
enable modelling of the users face at different ages based on the determined aging of the subject.

The apparatus may be configured to:
detect facial expressions; and
determine a similarity score based on the degree of similarity between facial expressions.

For example, based on the video input, the system may be configured to detect the changes in the face associated with a particular expression. For example, in a subject's smile, one side of the mouth may rise higher than the other and the subject's eyes may close slightly. The system could then look for possible matches with a similar smile based on image source input (e.g. photos and/or video).

An expression may be a particular configuration of the face used to convey emotion such as disgust, anger, fear, sadness, happiness, surprise, and contempt. An expression may include the facial configuration corresponding to one or more of: a smile, laughing, a frown, confusion, thoughtfulness and concentration.

The apparatus may be configured to present stimuli to the subject to illicit particular expressions while recording their face. For example, the apparatus may present a puzzle to illicit the expression the subject makes when concentrating. In this way, the expression may also be associated with an underlying mental state rather than simply the configuration of the face. In this way, the response of users to particular stimuli (e.g. a joke) can be matched. This may help avoid, for example, a grimace being matched with a smile. In other embodiments, the apparatus may be configured to determine an expression based on its similarity to other expressions. For example, raised mouth corners may be associated with a smile.

The matching apparatus of claim 1, wherein the apparatus is configured to:
detect facial gestures; and
determine a similarity score based on the degree of similarity between facial gestures.

A facial gesture may be considered to be a characteristic movement of the head and/or facial features. For example, a subject may laugh, nod or shake their head in a particular characteristic way which may be matched with other users. Gestures may be determined based on one or more video image sources.

The apparatus may be configured to filter the identified plurality of image sources and/or refine the similarity score based on associated interests.

The apparatus may be configured to harvest data from social media websites provided by the subject. This may allow the apparatus access to a greater quantity of raw data which could improve matches while reducing the additional input required from the user.

The apparatus may be configured to automatically update the facial characteristics of the subject person based on new subject image sources being received by the matching apparatus.

The technology may use one or more of the following in combination: Image Analysis; 3D Modelling; and Artificial Intelligence.

An image source or an image medium may comprise a picture, video and/or a photograph. The image source or image medium may be stored as a computer readable file (e.g. in a digital format).

A search of image sources may comprise:
reading a potential matching image source from an image source database;
determining facial characteristics associated with the potential matching image source;
comparing the determined facial characteristics with the subject facial characteristics; and
determining a similarity score.

A search of image sources may comprise:
reading a potential matching person from a database;
reading a plurality of image sources associated with the potential matching person;
determining facial characteristics associated with the potential matching person based on the plurality of image sources associated with the potential matching person;
comparing the determined facial characteristics with the subject facial characteristics; and
determining a similarity score.

A search of image sources may comprise:
receiving facial characteristics associated with a potential matching person or image source stored in a database;
comparing the received facial characteristics with the subject facial characteristics; and
determining a similarity score.

The matching may be configured to,
store a list of associations between one or more standard-sized objects (e.g. pint glass, bottle, beverage can, door handle, light switch, keyboard, sheet of A4 or US-letter paper, business card, coins, a bank note) and sizes (e.g. width of a U.S. dollar bill);
identify a reference object within the received image source, wherein the reference object corresponds to a standard-sized objects in the list;
determine the distance between the reference object and the camera used to capture the image based on the corresponding size of the reference object;
take the average measurement of the face; and
calculate the face size based on the distance between the object and the face relative to the camera and the corresponding size of the reference object.

For example, if the reference object is adjacent to the user's face, the face size may be scaled using the standard size of the identified object. If the user's face is further away from or closer to the camera, the apparatus may calculate the scaling using Euclidean distance formulae for the distances between the camera and the user's face and between the camera and the identified object.

The matching apparatus may be configured to make repeated determinations of face size based on multiple image sources.

The matching apparatus may be configured to assign a face size within a predetermined range.

The predetermined ranges for face sizes may comprise one or more of the following ranges:
Head breadth (The maximum breadth of the head, usually above and behind the ears): between 13 to 17 cm.

Interpupillary breath (the distance between the centers of the pupil of the eyes): 5.5 to 7.5 cm.

Bitragion breadth (the breadth of the head from the right tragion to the left tragion—the tragion is the cartilaginous notch at the front of the ear): 12 to 16 cm.

Menton (chin) to top of head (the vertical distance between the bottom of the chin to the top of the head): 19.5 to 26 cm.

Circumference of the head: 55 to 59 cm.

The predetermined ranges may be adjusted or refined based on sex and age. This may allow the predetermined ranges to be reduced to allow for more accurate matching. For example, a younger person (e.g. teenager) may typically have a smaller face than an older person (e.g. 20 years old or above) and a female may typically have a smaller face than a male.

According to a further aspect, there is provided a method of comparing facial appearance, the method comprising:

receiving multiple subject image sources of a subject person including at least one video;

processing the subject image sources using 3D facial modelling to determine a set of facial characteristics of the subject person;

performing a similarity search for images based on the determined set of facial characteristics;

in response to the similarity search, identifying a plurality of matching image sources of one or more other persons that are similar in appearance to the subject person;

providing search results based on the subset of the plurality of matching image sources.

According to a further aspect, there is provided a computer program comprising computer program code configured, when run on a computer to:

receive multiple subject image sources of a subject person including at least one video;

process the subject image sources using 3D facial modelling to determine a set of facial characteristics of the subject person;

perform a similarity search for image sources based on the determined set of facial characteristics;

in response to the similarity search, identify one or more matching image sources of one or more other persons that are similar in appearance to the subject;

provide search results based on the one or more matching image sources.

According to a further aspect, there is disclosed a method of matching similar faces using image processing to determine facial similarities.

The apparatus may be configured to, for a received image source of the subject taken by a camera, determine the distance between the camera and the subject when the image source was taken. The camera may be a stereo camera. The stereo camera may form part of the apparatus.

The apparatus may be configured to determine the degree of facial mobility based at least in part on the video image source; and determine the set of facial characteristics of the subject person corresponding to the subject's resting face based on the determined degree of facial mobility. The degree of facial mobility may be a measure of how much the face can move relative to the underlying fixed structure (e.g. how much can the cheeks move with respect to the cheekbones).

According to a further aspect, there is provided a matching apparatus comprising a processor and memory, the processor and memory configured to:

receive one or more subject image sources of a subject person including at least one video;

processing the one or more subject image sources to determine a set of facial characteristics of the subject person;

performing a similarity search for matching image sources based on the determined set of facial characteristics;

in response to the similarity search, identifying one or more people that are similar in appearance to the subject person;

providing search results based on the identified one or more people.

The identified one or more people may be persons other than the subject person. The apparatus may be configured to identify other photos of the subject person.

A user of the system may be the subject.

The method may comprise analyzing a plurality of subject image sources to identify the characteristic parameters.

The analysis of the plurality of subject image sources (e.g. corresponding to potential matches) may occur in advance of receiving the search image source.

The analysis may take into account a popularity factor (e.g. based on the number of friends or followers a user has on a social media website). The popularity factor may increase or decrease the matching score. The analysis may be configured to match users with similar popularity factors.

At least one similar facial feature may include a distance parameter (e.g. inter-eye distance). At least one similar facial feature may include an area parameter (e.g. area of face). At least one similar facial feature may include a volume parameter (e.g. volume of head).

A plurality of results may be ranked and presented in ranked order (e.g. in order of overall similarity score).

The system may receive one or more facial images from one or more sources including a user, a social network and an image search engine.

A peak is a point in time and/or condition at which a person is known to be at his/her most distinctive look. It is determined by analyzing all media files available and selecting a subset to make qualitative set of data for a particular group. The qualitative set of data is then analyzed for many people and for groups (gender, race, etc.). This process, when done for a large group of people with large quantity of data, will reveal patterns that provide a set of characteristics (times, conditions) for each group of people that correspond to the Right Peak.

The apparatus may comprise a control apparatus having a memory (e.g. storing computer program code and/or a database); a processor; a user interface; and a display.

Memory may comprise one or more of, for example: a non-transitory medium, a CD, a DVD, flash memory, a floppy disk, a hard disk, volatile memory, non-volatile memory or Random Access Memory (RAM).

A processor may comprise one or more of, for example: a central processing unit (CPU); a microprocessor; a central processing unit contained on a single integrated circuit (IC); an application-specific integrated circuit (ASIC); an application-specific instruction set processor (ASIP); a graphics processing unit (GPU); a network processor, a microprocessor specifically targeted at the networking application domain; a multi-core processor.

A user interface may comprise a display. A display may comprise one or more of, for example: a liquid crystal display (LCD); a computer screen; a smartphone screen; a tablet computer screen; a touchscreen; a projection screen; and a television screen.

A user interface controller may comprise one or more of, for example, a touchscreen, a keyboard, a mouse, a joystick, and a touchpad.

The processor may be configured to interact with remote databases. The remote databases may be accessible via the internet. It will be appreciated that the memory, processor and display may or may not be part of a single computer. That is, the various components may be stored across several devices. For example, the database may be stored on a cloud computer. That is, the end user may have a client terminal which is configured to access a remote server which performs the calculations. Some embodiments may be configured to mine published data (e.g. published on the internet). For example, the controller may be configured to extract key data points from electronic media (e.g. XLS, PDF, XML, CSV, PPT, etc.) sources with or without user intervention and store the extracted data in the database.

BRIEF DESCRIPTION OF THE FIGURES

Various objects, features and advantages of the invention will be apparent from the following description of particular embodiments of the invention, as illustrated in the accompanying drawings. The drawings are not necessarily to scale, emphasis instead being placed upon illustrating the principles of various embodiments of the invention. Similar reference numerals indicate similar components.

DETAILED DESCRIPTION

Introduction

As noted above, people with similar facial characteristics can form stronger relationships than those without. Therefore, efforts have been made to allow users of electronic devices to search for other users who have similar appearances.

However, there remains a need to permit better matching of facial characteristics.

The present technology relates to a method, implemented using a processor, memory and a computer program, to find and introduce one person to the other person, by analyzing facial figure, interests, and other information that is available about a person.

Various aspects of the invention will now be described with reference to the figures. For the purposes of illustration, components depicted in the figures are not necessarily drawn to scale. Instead, emphasis is placed on highlighting the various contributions of the components to the functionality of various aspects of the invention. A number of possible alternative features are introduced during the course of this description. It is to be understood that, according to the knowledge and judgment of persons skilled in the art, such alternative features may be substituted in various combinations to arrive at different embodiments of the present invention.

Characterizing the Subject

Figure 1:
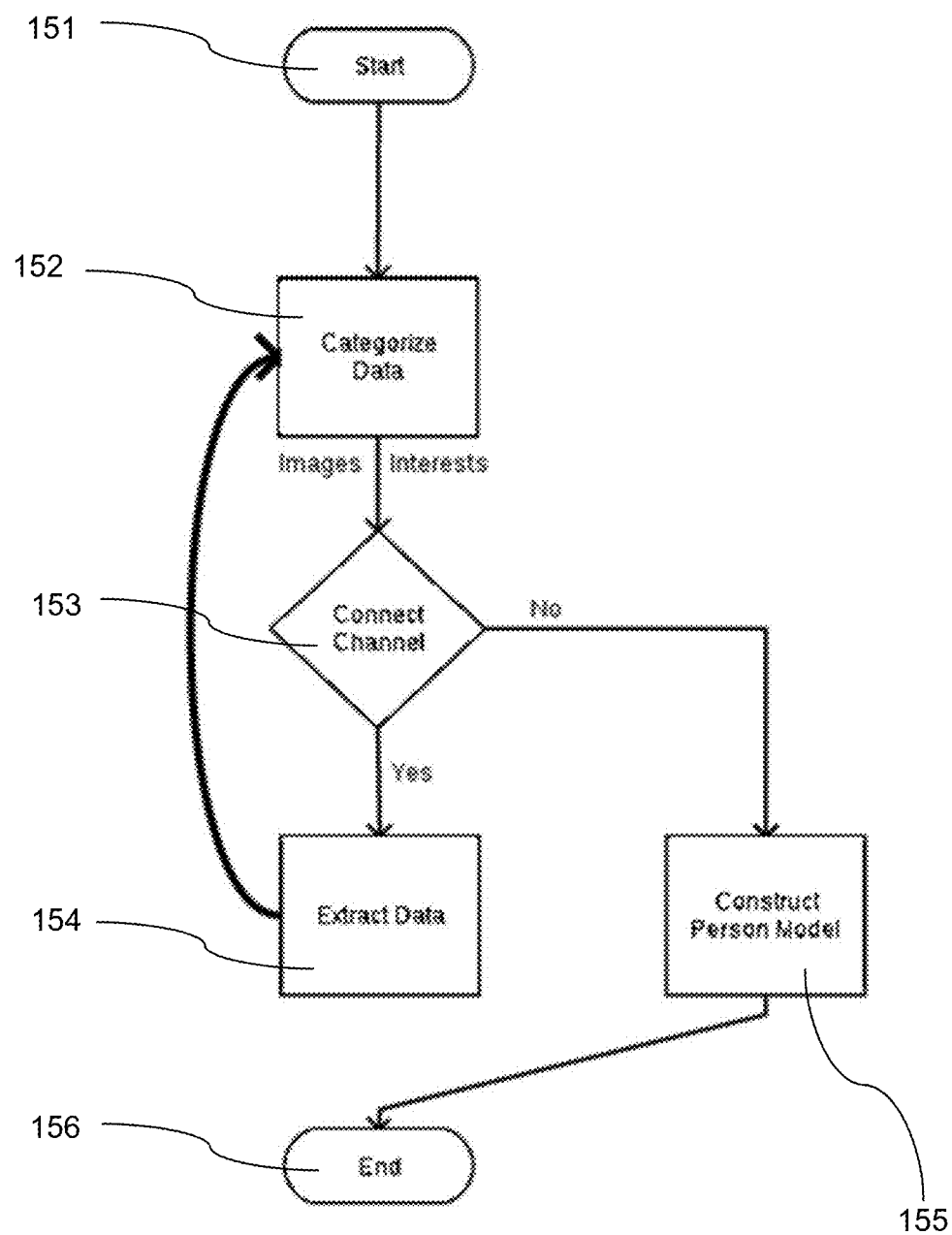
FIG. 1 is a flow diagram showing how a subject is characterized by an embodiment of the matching apparatus.

FIG. 1 shows how a first aspect of a matching apparatus is configured to obtain information from various sources to provide a person model for a subject. The person model in this case comprises a facial component which is a digital representation of the subject's face.

In this embodiment, the subject logs into the system (e.g. via a website) which starts 151 the recognition procedure. In this case, the subject is prompted to provide initial information. The initial information in this case includes a photograph which may be taken at the time of registration (e.g. via a phone or webcam); personal details such as interests and hobbies, gender, age (or date of birth); and other social network channels that the user belongs to.

Figure 2:
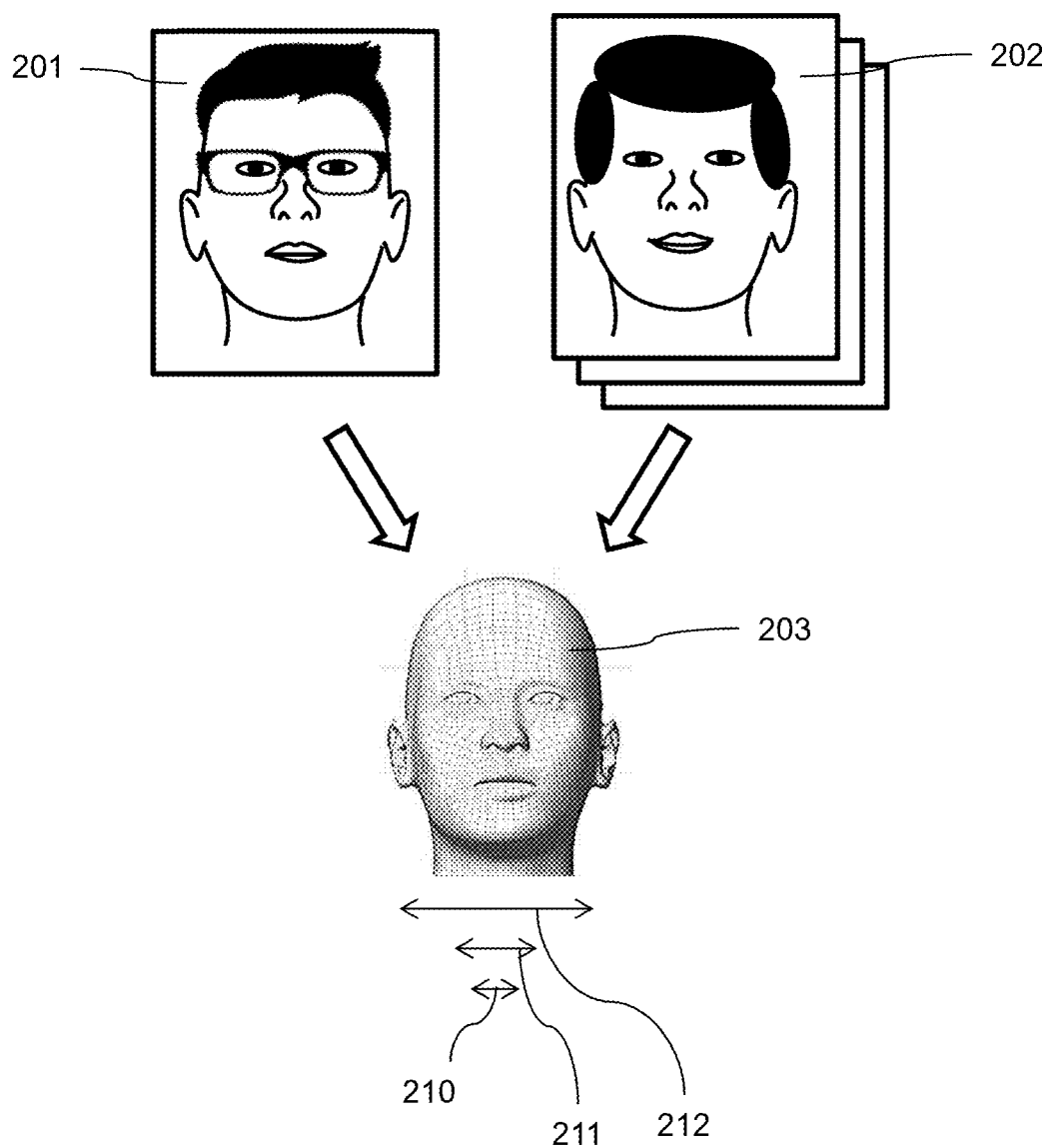
FIG. 2 is a schematic diagram showing how image sources of a subject are processed by the embodiment of FIG. 1 to determine facial characteristics.

The apparatus is then configured to categorize 152 these data by taking the image source to perform facial modelling (as shown in FIG. 2) and by processing the textual data by, for example, calculating the subject's age and storing their interests in a database.

It is known that recognition of person in an image source may be affected when there is a change in pose, accessories, lighting, and age of the same person. This has been addressed in the past using estimation, and closest probable guess.

The inventors have realized that it is more accurate to characterize a person and potential matches using 3D modelling technology. This is particularly effective when the 3D modelling technology is used to analyze multiple image sources of the person (e.g. from a video and/or through multiple photos). By using a video, the 3D modelling processor may be configured to determine how the user changes their expression in real time in a way that may not be possible using multiple "snapshot" photos.

A video file generally contains hundreds or thousands of photos in a time-ordered series of frames, typically 60 photos/frames per second. Because of this, a video may be more advantageous to analyze compared to a single photo. A video may give large quantities of information including one or more of:

Expression changes;
Movement and different distances from camera;
Different poses and face direction; and
Different lighting and shades.

In this case, as shown in FIG. 2, the system is configured to collate image data from a variety of sources or channels. In this case, the sources include a photograph provided by the subject and a video harvested from the subject's social media channels and/or apps (e.g. Facebook™ or WhatsApp™). In this case, the user can connect additional channels by selecting websites which already store textual or image information on the subject. For example, they may connect 153 their social media account in order to grant the matching apparatus access to the image sources and textual information stored on the social media account.

The system can then extract 154 the information from these additional channels which is then processed and categorised to provide more sources to construct 155 the person model for matching. Constructing 155 the person model involves determining a set of parameters which characterise the person. These parameters will include facial characteristics and other information such as age, gender and interests. This part of the process will be complete 156 when the set of facial characteristics is determined.

Analyzing the Subject's Face

In this case, the system is configured to process the image sources to form a digital representation of the subject's face (or head). As shown in FIG. 2, the source images in this case include a current photograph 201 provided by the user when he set up the account and an old video 202 harvested from a linked social media account.

It will be appreciated that the system may be configured to recognise changes between the different image sources to determine features which should not be used for matching. For example, in this case, the user is not wearing glasses in the video source 202 but is wearing glasses in the photo 201. Similarly, the subject's hairstyle is significantly different in the two sources 201, 202. Based on these changes, the system in this case is configured to ignore glasses and hairstyle when making a match. In this case, if the subject had a consistent style of hair and glasses, these features may be used to calculate a match. In other embodiments, intrinsically variable features such as hairstyle, facial hair and glasses may be ignored.

In this case, the system is configured to form a mesh 3D representation 203 of the subject's face. From the video 202 (and the photograph 201), changes in the subject's expression may be used to calculate a neutral pose (e.g. a resting face). To model the face to be in a neutral pose, the system is configured to determine the neutral peak which may be important when it comes to finding similarities.

A Neutral Pose model is a representation of the person's resting face which is directed straight towards the camera. That is, the face is not, for example, looking right or left or up or down.

A Neutral Peak is a point in time/condition (age, mood, time of day, lighting condition, etc.), at which the person is determined to be most neutral or most distinct in looks. This is determined by the system for different races, genders and ages. It is therefore not a model, but rather distinct criteria or settings used in the Neutral Pose model creation.

The system may be configured to disregard some of the features that may be arbitrarily changed, such as hair.

The Neutral Peak is determined by analyzing media files (images and videos), by comparing these files to determine one or more images that have distinctive features. It may examine one or more of:
 Lighting;
 Visible portion of the face;
 Details level (Pixels);
 Face direction; and
 Expressions
to generate a sub-set of files, whose weight is higher, and that are used to determine the Neutral Peak.

This main process uses machine learning technology to determine the right peak for each person given age, race, gender and other qualities.

The Neutral Pose model can be constructed for the Neutral Peak (this is sometimes referred to as Neutral Peak Model, that is a Neutral Pose model for the Neutral Peak) or can be constructed with different settings.

The process comprises analysing each part (or visible portion) of the given media (picture or video) into its own model, then comparing those to other given media.

The neutral pose is a machine-recognizable representation of a person, based on image sources, such as those obtained from Facebook™, Twitter™, YouTube™ or any other social media website. These sources are used to harness data about the user that is useful for model creation. The data may be weighed using weighting values to reflect the differing degrees of importance of the different data obtained.

When determining the Neutral Pose model, the first step is to confirm that the system has positive recognition of the person first (e.g. by recognising the person from their face or by the user informing the system that this is an image of a particular person), then this new data will be embedded into the model (e.g. in the form of an attachment), and will also be used to contribute in guiding the construction of the model itself. The weight, category, date, and other information available for this attachment will also influence its effect in the final model.

Using an attachment is one approach for when the system detects data in the given media. This data is then known and is valuable information, thus the system will store it in a text-based format (e.g. JSON—JavaScript Object Notation), and stores it alongside the original media, attaching them together by common key (Unique Random Number) so that both files will be prefixed with this number. The system may be configured to archive those files in compressed format in the same manner.

An attachment may contain meaningful information about each media file, its information is key mainly in analyzing the media files, although its main role is to save time when querying this information again.

A background process may be configured to run analysis periodically on each given media file and extract meaningful information into the text-based files to make further queries faster.

Neutral Pose model is constructed for the right peak that is determined, but may also be constructed given age as parameter, so that a Neutral Pose model may be constructed for the subject at a younger or older age.

If an old media file of the person is given to the system, generating a Neutral Pose model for different ages may help the system to determine if it is of the same person or not. Also, if a person aged over time and a new media file is given to the system, the apparatus may be configured to process this new data, and recognize the person using old media that was previously available.

If, for example, there was a change to the person formation (e.g. their nose shaped changed, because of an accident or by other means) then the system may make take this into account (e.g. by reducing the weight placed on nose shape for image sources dated before and/or after the change in shape).

This process may use a guidance mesh (e.g. mesh 203). The mesh is an abstract representation of each part of the human face that is adapted to fit different criteria. It may be used as a guidance to:
 Acceptance of model
 Correction course
 Deviation measurement A guidance mesh is a loose representation of human face parts, those are mostly used as guidance to the system when analyzing media files.

For example, the nose has a distinct shape that is common in all humans, regardless of the different detailed shapes. Therefore, because the general form is common, an abstract representation is possible which may be used as guidance to:
 Accept a shape in the model;
 Correct the course of the detection; and
 Used as a base to measure the deviation from.

If a person is known to the system beforehand, then the system may be configured to detect if a change occurred.

From this mesh a series of parameters are calculated. It will be appreciated that there could be a large number of ways of representing a face or head digitally. For the purposes of this example, a number of parameters are calculated including, face width 212, inter-eye distance 211 and nose width 210. These are just examples, and it will be appreciated that many other parameters may be used.

There are significant difficulties in technologies in this space, including identifying the human face and recognizing them. Some factors which have not been fully considered in current technology are things like age, distance from the camera, lighting conditions, and even mood.

By using a variety of inputs, the 3D modelling processor may be configured to study different pictures to learn about the person's figure, his/her facial features and to construct 3D model of them based on the 2D image sources provided (e.g. based on the current pose and distance of each image).

In this case, by accumulating data as a 3D model, the facial modelling technology is configured to extract a neutral pose by looking through many given pictures and/or videos. For example, if the video were of a user reading a sentence, the facial modelling program would be able to determine the range of motion of the user's face and be able to deduce the neutral pose based on the range of motion.

It will be appreciated that the more channels that are connected for the person the more accurate the model or digital representation of the subject's face and/or head may be. For example, one of the channels could include previously uploaded photos and videos (e.g. from online platforms such as Facebook™ and YouTube™).

Based on the determined model for the subject, the facial modelling processor may be configured to better identify the subject and/or better identify matches for the subject.

Matching

Figure 3:
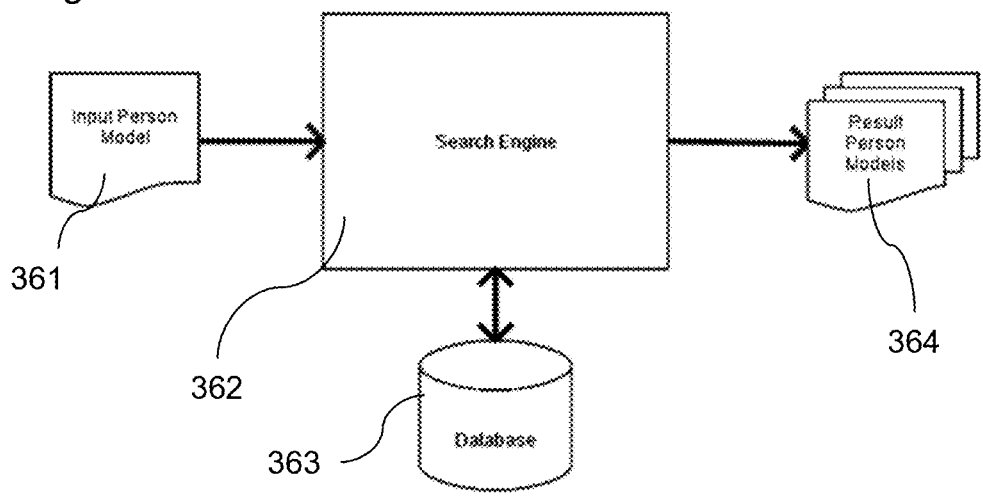
FIG. 3 is a flow diagram showing how a subject is matched with other potential matches by the embodiment of FIG. 1.

Having established a set of parameters or facial characteristics, the system is configured to determine a series of matches based on these parameters. This is shown in FIG. 3.

The matching apparatus is configured to take the characteristics determined by for the subject (the input person model 361) and compare this using a search engine 362 with models (comprising facial representations) of other users stored in the system in a database 363. Based on the comparison, other users are identified 364 based at least in part on the similarity between the set of parameters which characterise their faces and the set of parameters which characterise the subject's face. It will be appreciated that the similarity of other non-facial parameters may be taken into account, such as one or more of interests, date of birth, place of birth, home location, skin colour and gender.

In this case, overall facial matching score, $\theta_{s-i}$, between the subject, s, and potential match, i, is based on determining the weighted similarity of the n determined parameters, $A_j$, (e.g. inter-eye distance, face width) for the subject, $A_{sj}$, and the other individuals, $A_{ij}$, stored in the system database. A weighting factor, $\sigma_j$, is used for each parameter, $A_j$, to control (increase or decrease) the relative importance of a particular feature in determining the overall matching score. For example, in this case, the score is calculated according to the following equation:

$$\theta_{s-i} = \sum_{j=1}^{n} \sigma_j \left\{ \frac{A_{sj} A_{ij}}{[(A_{sj} + A_{ij})/2]^2} \right\}$$

The system is then configured to perform this calculation for each of the individuals in the database. Those with the highest overall matching score are provided to the user as possible matches. It will be appreciated that the system may be configured to limit the number of results by, for example, only showing results with a matching score exceeding a predetermined threshold and/or providing a limited number of closest matches (e.g. best 10 or 100 matches).

As noted above, the system, in this case, also collects personal interests about the person that may be used to match him/her with another person.

Figure 4:
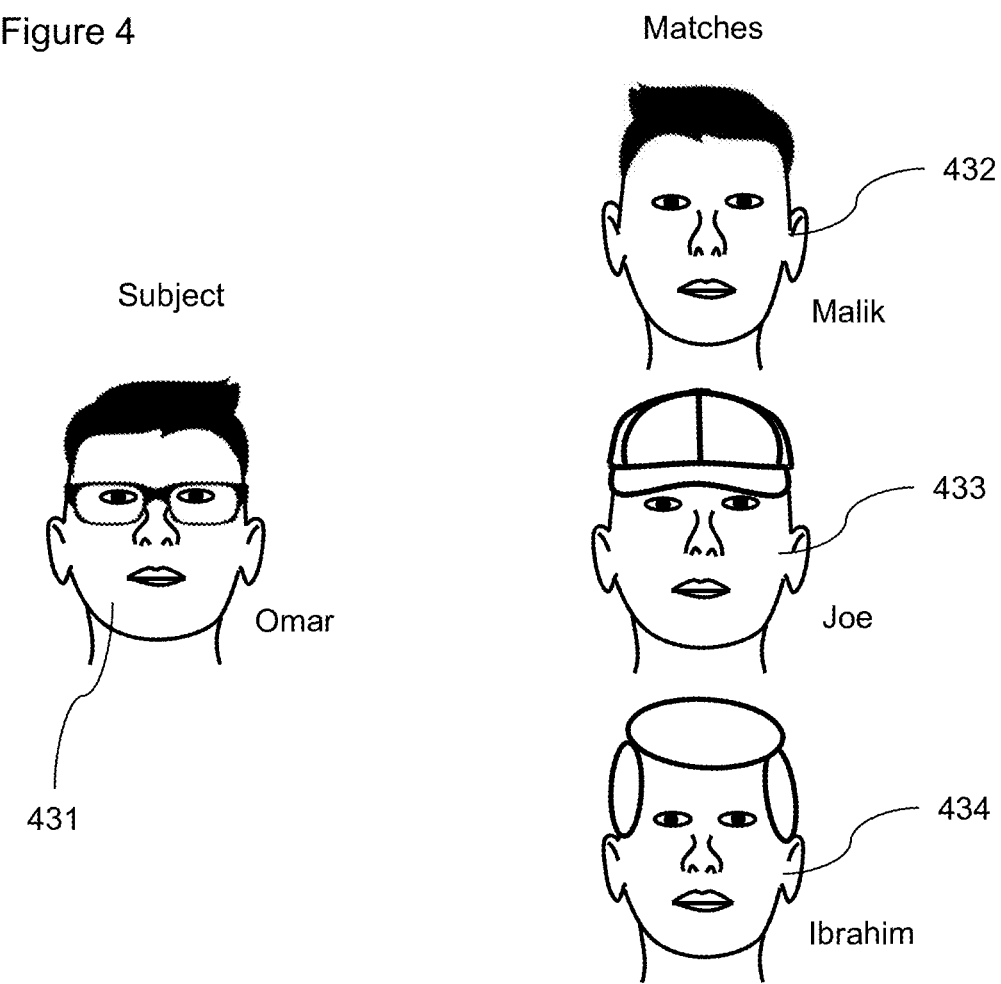
FIG. 4 is a summary of the matches found by the system of FIG. 3.

In this case, as shown in FIG. 4, the system has determined three matches for the subject, Omar 431:

Malik 432 has similar eyes and nose but a thinner face;
Joe 433 has similar eyes and face width, but a thinner nose;
Ibrahim 434 has a similar nose and face-width but has larger eyes.

The system may be configured to present the matches in order of calculated similarity. It will be appreciated that when calculating a single similarity score from multiple constituent parameters, there may be different ways of obtaining the same score. This is the case in this example, where each match has some features which are more similar to the subject than others.

Feedback

In this case, the system is part of a social media system which allows users to establish electronic relationships. In this case, Omar decides that Joe and Malik look interesting and so sends relationship requests to Joe and Malik based on the match. In this case, this relationship request indicates that Omar considers that Joe and Malik are potentially successful matches. In response, the system is configured to increase the weighting, $\sigma_j$, of the matching parameters which are similar between Omar and Joe and Omar and Malik, and reduce the weighting of those features which are dissimilar between Omar and Joe and Omar and Malik.

In this case, the weighing of eye similarity is increased because this feature was similar in the subject Omar 431 and the two selected matches, Joe 433 and Malik 432. This will mean that in future matching searches, these features will be considered more important by the search engine. This should improve the quality of the matching as different people may be found based on the reweighted parameters.

In this case, the requests are sent to Joe and Malik and each comprises: a photograph of Omar, an interest profile, and the matching results. After reviewing the request, in this example, Joe accepts the request, but Malik does not. This indicates that Joe considers the match a good one, but Malik does not. Therefore, the system is configured to increase the weighting of the similarities between Joe and Omar but downgrade the weighting of features common to Omar and Malik. Therefore, in this case, the weighting associated with similarity in face-width may be increased. The eye similarity may remain unchanged as this was common in the Omar-Joe match and the Omar-Malik match.

As the relationship develops, the weightings may be further adjusted. For example, the weightings may be adjusted to increase the importance of the similarities between pairs which have a successful relationship. A successful relationship may be determined based on relationship length, frequency of contact (e.g. via text, photo and/or video messages, and/or interaction with each others' posts), quantity of contacts (e.g. number of messages exchanged).

This feedback allows the system to determine which features are the most important for establishing meaningful relationships between users of the system and so provides better possible matches in the future. Importantly, the system may be configured to determine a measure of the success of a match passively by observing how the users interact on the system (e.g. rather than requiring a user to specifically comment on the suitability of the match).

Online Registry

Figure 5:
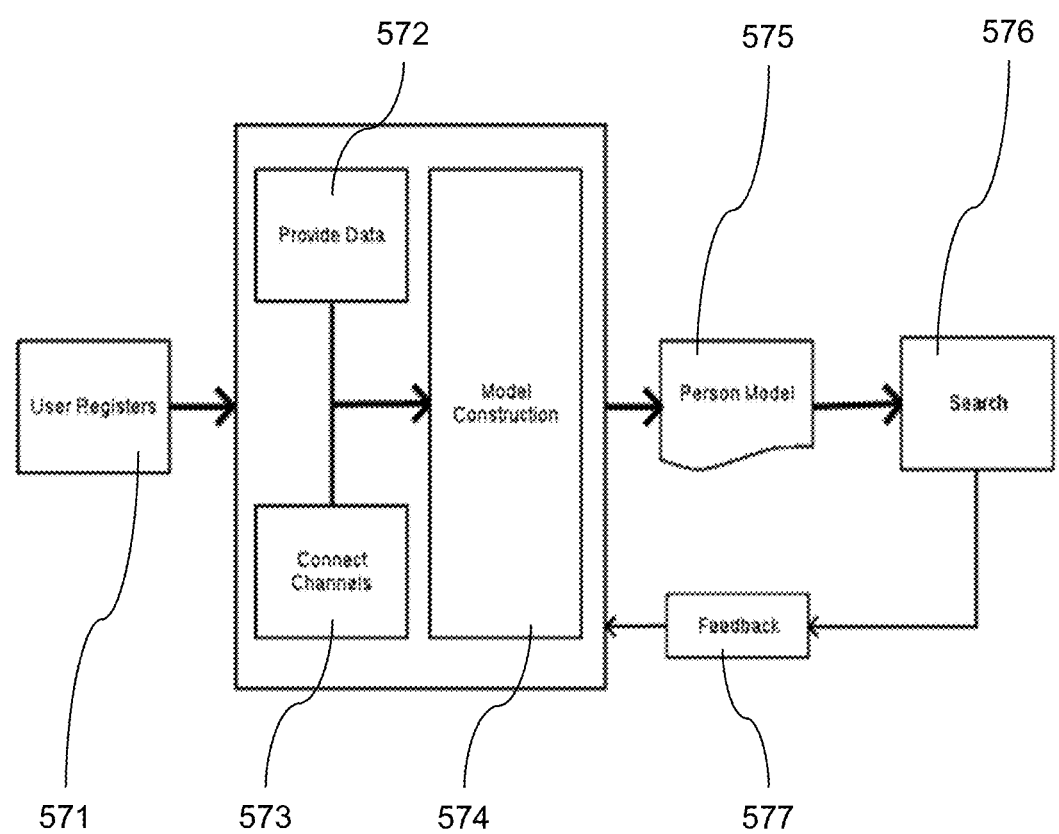
FIG. 5 is a flowchart showing how the apparatus of claim 1 could be used in a social networking platform.

FIG. 5 shows a flowchart showing how the matching apparatus could be used in a social networking platform. The matching apparatus in this case comprises a processor and memory, the processor and memory configured to:

receive multiple subject image sources of a subject person including at least one video;

process the subject image sources using 3D facial modelling to determine a set of facial characteristics of the subject person;

perform a similarity search for image sources of faces which are similar to the subject's face based on the determined set of facial characteristics;

in response to the similarity search, identify one or more matching image sources of one or more persons that are similar in appearance to the subject person; and provide search results based on the identified one or more matching image sources.

In this case, the user would register 571 with the social networking platform and provide data 572 (e.g. a photo, interests, age) and connect 573 with other online channels which may have other versions of similar data (e.g. Facebook may already have photos, age information and interest information). This data is collated to construct a model of the subject person 575 using a model construction module 574, based on the facial characterisation and the subject's interests.

The system is then configured to search for possible matches based on other stored person models, each person model comprising facial characteristics (and possibly other data relating to, for example, interests, age, gender etc.). These matches are presented to the user of the system. Based on the user interactions with the matches presented, the module construction module may be adapted to provide better results for future searches.

Age

In other embodiments, the facial modelling processor may be configured to reconstruct this same person model for different ages. That is, the system may use knowledge about the human aging process, and the date at which each image source was taken to look back/forward into the person "model" and improve recognition.

For example, the facial modelling processor may be configured to make some adjustments based on conventional aging models to calculate what a particular face would look like at different ages. For example, the facial modelling processor may be configured to add wrinkles as a person ages in accordance with a predetermined model.

In addition, other embodiments may be configured to determine the date of the various image sources and videos provided to the facial modelling software. For example, the system may be configured to read time-stamp data from a series of videos provided by the user (and possibly also the user's age or date of birth). The facial modelling processor may then be configured to examine the aging of the face of the subject by examining differences in the various time-stamped input data. This may then be used to adjust the aging model to more closely match the subject under consideration. For example, if the aging model models wrinkles using a wrinkle onset age and a wrinkle increase rate, these values may be adjusted based on input data to more accurately determine the likely aging effects at different points in the subject's life. In this way, the system is configured to reconstruct this same person model for different ages.

Distance from Camera

In other embodiments, the system may be configured to determine the distance from the camera when the various input source images were shot, thus knowing/guessing the size of the face and figure. This may be an important factor when trying to identify or match a person in the image source.

In one embodiment, the system will be configured to process photographs or videos which have been captured by a stereographic (or stereo) camera.

A stereo camera is a type of camera with two or more lenses with a separate image sensor or film frame for each lens. This allows the camera to simulate human binocular vision, and therefore gives it the ability to capture three-dimensional images, a process known as stereo photography.

By using stereo images, the distance between the user and the camera may be determined. This may help determine the size of the user's head and face.

In other embodiments, by using different media files, a scale measurement may be associated with the subject's overall face. This base measurement may then be reversed when presented with new data for which the distance from camera is not known. That is the reverse calculation may input the size of person overall face in pixels and the number of pixels in the media file, to calculate the distance between the subject and the camera when the media file was taken.

Also, the guidance mesh (standard) may be used to correct the detection and measurement of distance, and to allow the system to make an estimate from the first few media files. Over time when enough media files are available about a person a determined face size will be more accurate and the apparatus may be configured perform the reverse calculation to determine a measure of the distance from the camera based on an image.

Other Options

Once a person is registered into the system, the system may be enabled to start collecting information about this person, whether he enters that into the system directly or through other Connected Channels (e.g. signing in through Facebook™ or YouTube™). The system starts to construct a 3D model of the person using all data that is available in the Model Construction process. This may be repeated periodically, or as new data is collected.

The system is then configured to perform a search of similar persons in its database, and/or notify the user once a new person is registered that is deemed similar to him/her.

In addition to looking for facial features, the system may also use an interest-based algorithm which in turn uses machine learning branch of AI to find a user that is deemed similar.

The system may be configured to facilitate feedback from the users and/or subjects to improve its machine learning algorithm and to learn how people perceive similarity. This feedback is used to improve future searches. For example, an overall facial similarity score may be based on a range of parameters (e.g. inter-eye distance, overall shape of face, eye colour, skin colour, and/or length of nose). Based on user feedback, the system may increase the weight of some of these aspects and decrease others to provide a more useful match. For example, if users consistently indicate that they are happier with matches with the same face shape, even if the inter-eye distance is different, the system could increase the relative importance of the face shape relative inter-eye distance when calculating an overall facial similarity score.

The feedback may occur automatically. For example, the system may be configured to measure the degree of contact with potential matches. For example, the system may be configured to use one or more of the following as indicators of successful matches:

initiating a contact request with one of the provided possible matches;

a contact request being accepted;

interactions between the matched users (number of messages exchanged, duration of relationship, length of messages etc.).

The system/apparatus could be used on, for example:

On a social network site, which introduces people to each other using similarity technology.

A search engine for similarities for the purpose of amusement.

An online dating website.

Adoptions Sites or Applications—For example, where parents are looking for the children they put up for adoption or where children are looking for their birth parents. They place photos on the Adoption Site and the system reviews each to provide matches.

Ancestry Sites or Applications—The technology may be adapted to find similarities of people on ancestry sites and/or to find family members from other countries.

Lost or Misplaced Family Member—Like an Adoption Site, the system may allow photos to be placed on the site for automated detection. Sometimes people are displaced during a natural disaster (earthquake, flood, etc.) or war etc. Ambulances take them to a hospital that is not known to the parents/family members. Currently, the family will put up photos on a bulletin board or make t-shirts for the people they are looking for. Other family members go to the bulletin boards to manually look and find which hospital their loved ones are in. A system could automate this process and would not be limited to a single image.

Morgue ID Service—Similarly, for morgues, to reconnect family members to deceased people from natural or human disasters. This system may be configured to be used by authorities (e.g. government organisations, relief agencies such as the Red Cross or Médecins Sans Frontières).

Missing Person Site—Law Enforcement—Missing Persons can be missing for many years. Some missing persons may be missing since they were young, so they may grow up not knowing they are "missing". The technology may help solve some cold case missing persons files. Incorporating aging models may be particularly important in this application.

Live or Recorded Video Surveillance. The technology, is very suitable to live and recorded video, as these media typically show a person in multiple poses, angles and lighting, rather than a single picture, giving better capabilities for 3D compilation. Example uses include:

Law enforcement may make use of such a technology, when pursuing a suspect.

Casinos in United States use video surveillance at the entry points to watch for banned people. Some people may disguise themselves, so the use of facial matching technology may increase the efficiency.

Although the present invention has been described and illustrated with respect to preferred embodiments and preferred uses thereof, it is not to be so limited since modifications and changes can be made therein which are within the full, intended scope of the invention as understood by those skilled in the art.

The invention claimed is:

1. A matching apparatus comprising a processor and memory, the processor and memory configured to:
   i) receive multiple subject image sources of a subject person including at least one video;
   ii) process the multiple subject image sources including images from the at least one video using 3D facial modelling to determine a neutral pose and a set of facial characteristics of the subject person in the neutral pose;
   iii) determine an overall similarity score based on a degree of similarity of each of the determined set of facial characteristics, wherein a contribution to the overall similarity score for each facial characteristic is weighted by a weighting value associated with a relative importance of an associated facial characteristic in determining the overall similarity score;
   iv) perform a similarity search for image sources of faces having undergone an analysis as in i) to iii) which are similar to the subject person's face based on the overall similarity score;
   v) in response to the similarity search, identify one or more matching image sources of one or more candidate persons that are similar in appearance to the subject person, wherein the one or more candidate persons are persons other than the subject person;
   vi) provide search results based on the identified one or more matching image sources; and
   vii) adjust the weighting values based on user input, wherein the user input comprises one or more of:
      the subject person requesting a digital connection with at least one of the identified matches;
      the digital connection being established between the subject person and at least one of the identified matches;
      a number of digital interactions between the subject person and one at least one of the identified matches after a digital relationship has been established; and
      a duration of digital interaction between the subject person and one at least one of the identified matches after the digital relationship has been established.

2. The matching apparatus of claim 1, wherein the apparatus is configured to enable the subject person to electronically contact individuals corresponding to the at least one of the identified matches.

3. The matching apparatus of claim 1, wherein establishing the digital connection comprises an identified candidate person accepting a request for digital connection from the subject person.

4. The matching apparatus of claim 1, wherein the digital connection is configured to enable the subject person and the identified matches to communicate directly using the matching apparatus.

5. The matching apparatus of claim 4, wherein the digital connection is configured to facilitate direction communication via one or more of: text messages, video messages and audio calls.

6. The matching apparatus of claim 1, wherein the digital connection is configured to allow the subject person and the identified matches to see content generated by each other.

7. The matching apparatus of claim 6, wherein the content comprises one or more of: text and images.

8. The matching apparatus of claim 1, wherein a said digital interaction comprises one or more of the following: one person interacting with a digital post of a second person.

9. The matching apparatus of claim 1, wherein processing the subject image sources from the at least one video includes analysis of one or more of expression changes, movement, distance from a camera, face direction, and lighting.

10. The matching apparatus of claim 1 configured to collate image data from two or more sources or channels.

11. The matching apparatus of claim 10, wherein the two or more sources or channels include a photograph provided by the subject person and a video harvested from a social media channel of the subject person.

12. The matching apparatus of claim 1, wherein processing to determine the neutral pose and the set of facial characteristics of the subject person in the neutral pose includes analyzing the subject person's face and adjusting for differences between different image sources to determine features not to be used for matching.

13. The matching apparatus as in claim 1, wherein processing to determine the neutral pose derives a neutral pose model of the subject person's resting face directed towards a camera.

14. The matching apparatus of claim 13, wherein the neutral pose model includes determining a neutral peak as a point in time/condition at which the subject person is determined to be most neutral or most distinct in looks from media files.

15. A method of comparing facial appearance, the method comprising:
i) receiving multiple subject image sources of a subject person including at least one video;
ii) processing the multiple subject image sources including images from the at least one video using 3D facial modelling to determine a neutral pose and a set of facial characteristics of the subject person in the neutral pose;
iii) determining an overall similarity score based on a degree of similarity of each of the determined set of facial characteristics, wherein a contribution to the overall similarity score for each facial characteristic is weighted by a weighting value associated a relative importance of the associated facial characteristic in determining the overall similarity score;
iv) performing a similarity search for facial image sources of faces having undergone an analysis as in i) to ii) which are similar to the subject person's face based on the determined set of facial characteristics;
v) in response to the similarity search, identifying one or more matching image sources of one or more candidate persons that are similar in appearance to subject person, wherein the one or more candidate persons are persons other than the subject person;
vi) providing search results based on the identified one or more matching image sources; and
vii) adjusting the weighting values based on user input, wherein the user input comprises one or more of:
the subject person requesting a digital connection with at least one of the identified matches;
the digital connection being established between the subject person and at least one of the identified matches;
a number of digital interactions between the subject person and one at least one of the identified matches after a digital relationship has been established; and
a duration of digital interaction between the subject person and one at least one of the identified matches after the digital relationship has been established.

16. A non-transitory medium storing computer program code configured, when run on a computer to enable the computer to:
i) receive multiple image sources of a subject person including at least one video;
ii) process the image sources using 3D facial modelling including images from the at least one video to determine a neutral pose and a set of facial characteristics of the subject person in the neutral pose;
iii) perform a similarity search for facial image sources of faces which are similar to the subject person's face based on the determined set of facial characteristics;
iv) in response to the similarity search, identifying one or more matching image sources of one or more candidate persons having undergone an analysis as in i) to iii) that are similar in appearance to the subject person, wherein the one or more candidate persons are persons other than the subject person;
v) provide search results based on the identified one or more matching image sources; and
vi) adjust weighting values based on user input, wherein the user input comprises one or more of:
the subject person requesting a digital connection with at least one of the identified matches;
the digital connection being established between the subject person and at least one of the identified matches;
a number of digital interactions between the subject person and one at least one of the identified matches after a digital relationship has been established; and
a duration of digital interaction between the subject person and one at least one of the identified matches after the digital relationship has been established.

* * * * *